C. E. FAGAN.
STEAM TRAP.
APPLICATION FILED MAR. 29, 1916.
1,231,144.
Patented June 26, 1917.
2 SHEETS—SHEET 1.
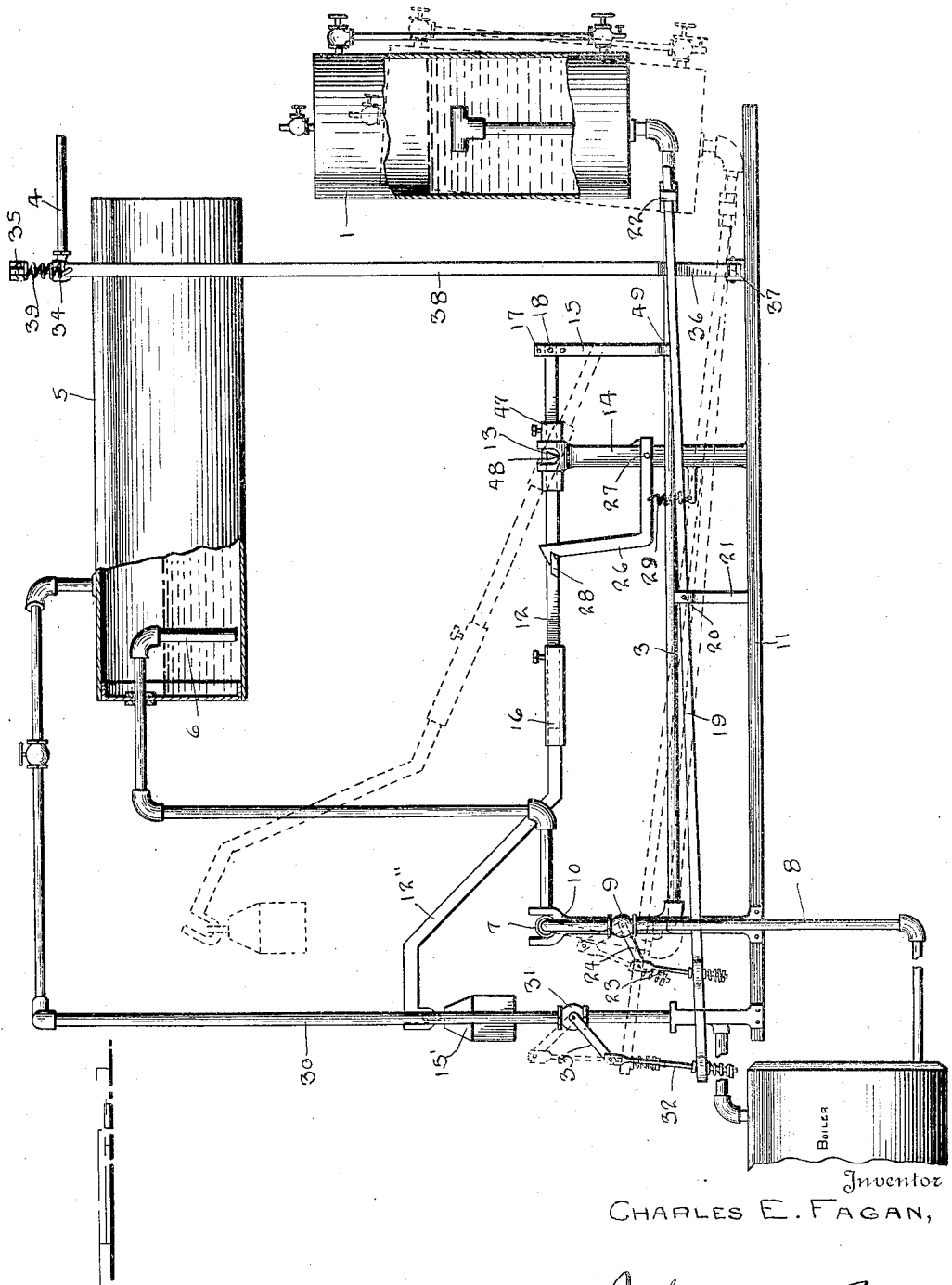
Inventor
CHARLES E. FAGAN,
By Johnson & Potts
Attorney

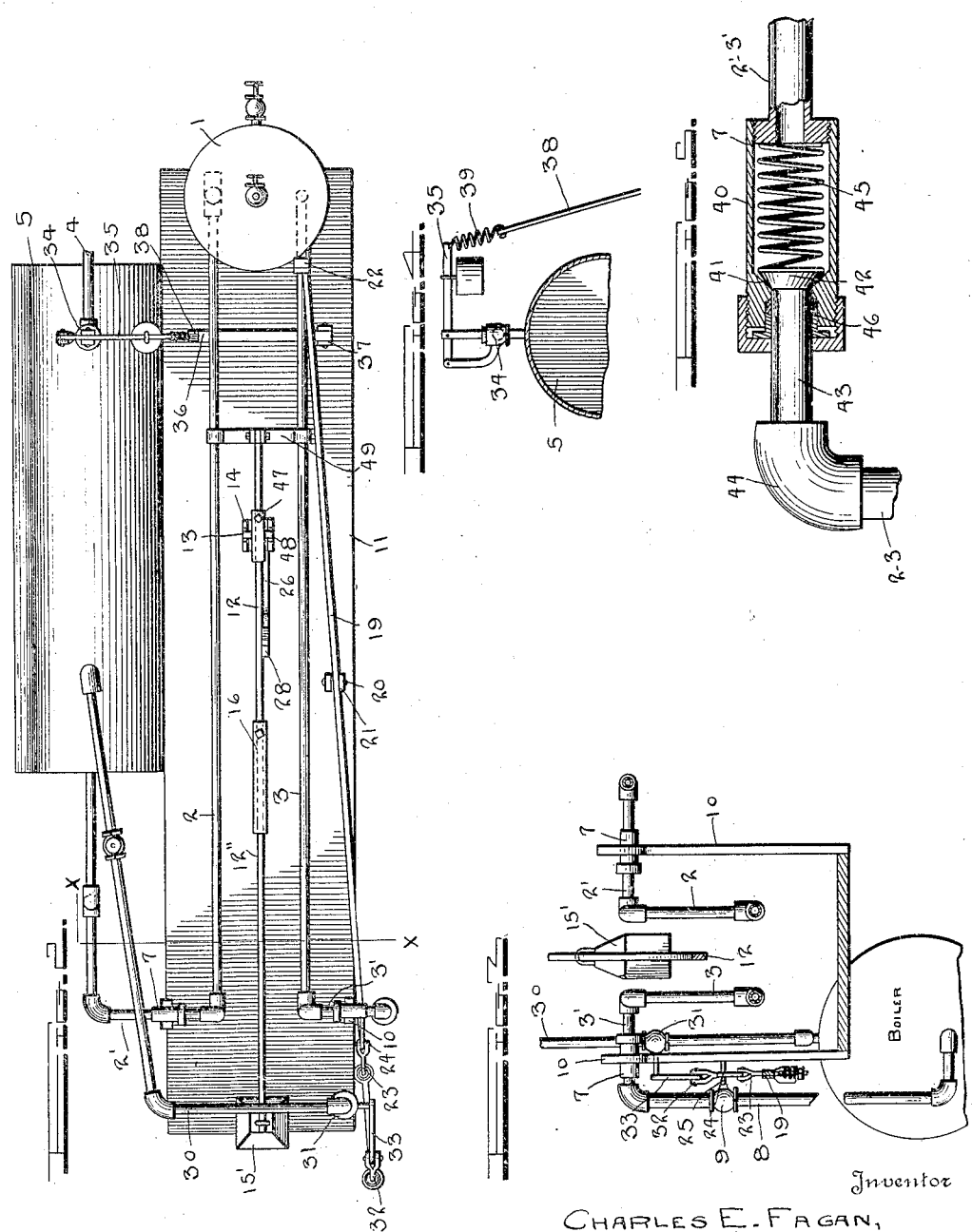

UNITED STATES PATENT OFFICE.

CHARLES E. FAGAN, OF BLACKSTONE, MASSACHUSETTS.

STEAM-TRAP.

1,231,144. Specification of Letters Patent. Patented June 26, 1917.

Application filed March 29, 1916. Serial No. 87,441.

*To all whom it may concern:*

Be it known that I, CHARLES E. FAGAN, a citizen of the United States, residing at Blackstone, county of Worcester, and State of Massachusetts, have invented certain new and useful Improvements in Steam-Traps, of which the following is a specification.

My invention relates to steam traps and particularly to steam traps adapted to automatically discharge at intervals the accumulated water of condensation. More specifically my invention relates to improvements on the steam trap disclosed in my Letters Patent No. 896,815 granted August 25, 1908.

In devices of the character under consideration a tank or trap proper is mounted upon the ends of a pair of substantially parallel and horizontal inlet and discharge pipe which are pivotally connected, at the opposite end from the tank or trap, with the main inlet and discharge pipes; and the trap, so mounted, is provided with a counter balance which normally holds the same in elevated position. A discharge valve is arranged in the discharge pipe, preferably the fixed portion thereof. When the water accumulates in the tank or trap to such an extent as to over balance the counter balance weight the trap swings downwardly, and automatic means are provided, governed by the downward movement of the trap, for opening the discharge valve. When a quantity of the water is discharged the counter balance weight returns the trap to normal position and automatically closes the discharge valve. This is briefly a description of the trap forming the subject matter of my patent aforementioned.

The object of the present invention is to provide a steam trap of the character mentioned, wherein the water of condensation shall normally be under the pressure of the system to which it is attached and which will discharge the water directly to the boiler. A further object of my invention is to provide means whereby the trap will come suddenly and positively into operation at each discharge thereof instead of approaching the discharge position gradually. A further object of my invention is to provide an improved steam and water tight swivel joint between the swinging and stationary portions of the inlet and discharge pipes. Other objects will appear hereinafter.

With these objects in view my invention consists generally in providing in a trap of the class mentioned, a pipe communicating with the boiler and also with the inlet of the trap and providing a valve in said pipe which is normally closed, and means for operating said valve automatically at or slightly before the opening of the discharge valve, whereby the pressure in the trap may be increased to boiler pressure at the time of the discharge, thereby allowing the trap to discharge directly to the boiler. My invention further consists in providing the pipe leading from the system from which the condensate is obtained with a safety valve whereby the system may be maintained at a regular reduced pressure, and equipping said valve with means whereby the operation of the trap will increase the tension of the valve to prevent the steam from the boiler entering the system while the aforementioned valve is open. My invention further consists in various details of construction and arrangement of parts all as will be fully described hereinafter and particularly pointed out in the claims.

My invention will be more readily understood by reference to the accompanying drawings forming a part of this specification, and in which—

Figure 1 is a diagrammatic side elevation of a steam trap embodying my invention in its preferred form, Fig. 2 is a plan view of the same, Fig. 3 is a detail transverse section on the line *x—x* of Fig. 2.

Fig. 4 is a detail of the pressure valve, and

Fig. 5 is a detail view upon an enlarged scale of one of the swivel joints.

Referring now to the drawings 1 indicates the shell or tank of the trap which is mounted at the ends of inlet and discharge pipes 2 and 3 respectively. The former is in communication with a pipe 4 leading to the system with which the device is used. In practice I prefer to interpose between the pipe 4 and the inlet pipe a receiver 5 which constitutes a tank of greater capacity than the tank 1. This receives the condensate from the pipe 4 and periodically discharges the same through the siphon pipe 6 to the inlet pipe 2. The inlet and discharge pipes 2 and 3 are provided with horizontally disposed alined portions 2' and 3' respectively in which are interposed swivel connections 7 whereby the tank 1 and pipes 2 and 3 are swingingly mounted, as shown and described in my patent aforementioned, the swivel joints 7 constituting the pivots. The portion 3' of the discharge pipe communicates with a preferably downwardly extending pipe 8 leading to the boiler and interposed in this pipe is a discharge valve 9. The swivel joints 7 are mounted in the upper ends of standards 10 projecting upwardly from a suitable base 11. 12 indicates a counter balance lever pivotally mounted as at 13 upon a standard 14. One arm 12' of the lever is connected by a link 15 with the pipes 2 and 3 adjacent the tank 1 and the free end of the opposite arm 12'' of the lever is provided with the counter balance weight 15'. 16 indicates means on the arm 12'' for adjusting the weight thereof to secure the desired counter balancing effect of the weight. It should be noted that the link 15 is provided with a series of apertures 17 to receive the bolt 18 whereby it is adjustably connected to the arm 12'.

Substantially parallel with the pipes 2 and 3 is a valve operating lever 19 pivotally mounted as at 20 on a suitable bracket or standard 21. One end of the lever is connected by a sliding connection 22 with one of the pipes 2 or 3 and the opposite end is connected by means of a link 23 with an operating arm 24 on the stem 25 of the valve 9. With the arrangement shown it is obvious that when the accumulation of water in the tank 1 is sufficient to over balance the weight 15' the tank 1 will drop and in doing this will rock the lever 19 to operate the valve 9, opening the same so as to permit discharge of a portion of the accumulated water in said tank.

To prevent the tank 1 from moving down gradually with the increase of water therein I provide suitable means for locking the same in initial position until sufficient water has accumulated to completely operate the device. To this end I provide a dog 26 pivotally mounted on the standard 14, as at 27, below the pivot point 13 and equip the lever 12 with a detent 28 which, when the tank is in raised position, is normally engaged by the dog 26 holding the weighted arm of the counter balance lever down and the tank in raised position. When the water in the tank has accumulated to a sufficient degree to completely over balance the weight 15' it moves downwardly a slight distance and, owing to the arrangement of the pivots 13 and 27 and upon the further accumulation of water in tank the detent 28 is withdrawn from engagement with the dog 26, thereby allowing a quick drop of the tank. 29 indicates a spring for normally holding the dog in engagement with the detent 28.

It is obvious that provision must be made for equalizing the pressure in the trap when the valve 9 is opened. Otherwise the trap would not discharge to the boiler but the boiler pressure would produce a back pressure in the trap preventing its discharge. To overcome this objection I provide a pipe 30 leading from the boiler to the receiver 5 and interpose in this pipe a valve 31. This valve is operated by the lever 19 through a link 32 connected to an arm 33 on the stem of the valve 31. It will be noted, by reference to Fig. 1 of the drawings, that the arrangement of the arms 24 and 33 on the stems of the valves 9 and 31 respectively is such, together with the distances of the connecting links 23 and 32 respectively from the pivot 20 of the operating lever 19, that upon operation of the lever 19 the valve 31 will be first opened to balance the pressure in the trap and immediately thereafter the valve 9 is opened to permit of discharge to the boiler. In this connection it should be noted that the link 32, being a greater distance from the pivot point 20, moves a greater distance than the link 23; and also that the arms 24 and 33 are so positioned that the valve 31 will be rapidly opened whereas the valve 9 will be opened more slowly.

Means must be provided to prevent the pressure from the boiler entering the pipe 4 leading to the system. To this end a safety valve 34 is interposed in the pipe 4 and provided with the usual weighted lever 35 which is set to normally maintain the pressure in the tank 5 at the normal pressure of the system. Arranged beneath the pipes 2 and 3, adjacent the tank 1, is a lever 36 pivotally mounted at one end as at 37. The opposite end is connected by a link 38 with the weighted lever 35 of the safety valve 34. The lever 36 extends transversely of the pipes 2 and 3 and is held in engagement therewith by a spring 39 forming a part of the link 38. The spring 39 maintains the lever 36 in engagement with the pipes 2 and 3 and it is obvious that when the tank 1 moves downwardly increased tension is placed upon the lever 35 and this is so arranged that this tension will permit the pressure in the tank 5 to raise to that of the boiler without operating the valve 34. Hence, when the valve 31 is opened to balance the pressure in the trap the valve 34 is held tightly closed to prevent the increased pressure from passing into the system. When the valve 31 is closed and the trap returned to normal receiving position the valve 34 is relieved of the excess tension and permits a discharge of the slight accumulated steam in the receiver 5 into the system; but this is not sufficient to have any material effect thereon.

The joints 7 each comprise a tubular or cylindrical shell 40 fixedly connected at one end to the stationary portion of the pipes 2'—3'. The opposite end of the shell is internally thickened and provided with a ground seat 41 to receive a ground head 42 on the swiveled portion 43 of the pipes, said portion 43 being connected by elbows 44 with the pipes 2 and 3 leading to the tank 1. A spring 45 is interposed between the head 42 and the opposite end of the cylinder to maintain the former in close contact with the seat 41. A stuffing box 46 is provided at the thickened end of the tubular shell forming a steam and water tight joint.

The operation of the device will be clear from the foregoing description in that it has been described in conjunction with the construction of the several portions of the apparatus. However, it should be noted that other means are provided than the sliding weight 16, for adjusting the lever 12 to secure the desired counter balancing effect. To this end the lever 12 is mounted for longitudinal adjustment in a sleeve 47, the sleeve being provided with trunnions 48 whereby it is pivotally mounted upon the bearing 13. Means for correspondingly adjusting the position of the connecting link with relation to the pipes 2 and 3 must also be provided and to this end the link 15 is connected to a yoke 49 which is adjustably connected to the said pipes.

I claim:—

1. In a device of the class described, inlet and discharge pipes, inlet and outlet pipes pivotally connected thereto, a trap fixedly mounted upon the free ends of the last mentioned pipes, a counter balance for normally holding the trap in raised position, a pipe leading from the system with which the trap is to be used and in communication with the inlet pipe, a receiving tank interposed between the last mentioned pipe and the inlet pipe, a boiler with which said discharge pipe communicates, a pipe leading from said boiler to said receiving tank, a valve in the last mentioned pipe, a valve in the discharge pipe, and means operated by the downward movement of said trap for opening the valve in the last mentioned pipe and then the valve in the discharge pipe immediately thereafter, substantially as described.

2. In a device of the class described, inlet and discharge pipes, inlet and outlet pipes pivotally connected thereto, a trap fixedly mounted upon the free ends of the last mentioned pipes, a counter balance for normally holding the trap in raised position, a pipe leading from the system with which the trap is to be used and in communication with the inlet pipe, a receiving tank interposed between the last mentioned pipe and the inlet pipe, a boiler with which said discharge pipe communicates, a pipe leading from said boiler to said receiving tank, a valve in the last mentioned pipe, a valve in the discharge pipe, means operated by the downward movement of said trap for opening said valves, a pressure valve in the pipe leading from the system to the receiving tank and means governed by the downward movement of said tank for increasing the tension on said valve, substantially as described.

3. In a device of the class described, pivotally mounted inlet and outlet pipes, a steam trap mounted at the free ends of said pipes and movable therewith, a discharge pipe connected with the end of the outlet pipe, a receiving tank for the condensate, a siphon pipe connecting said receiver and said inlet pipe, an automatically operated valve in said discharge pipe, and a counter balance for said trap, substantially as described.

4. In a device of the class described, pivotally mounted inlet and outlet pipes, a trap on the free ends of said pipes, a counter balance lever pivotally mounted adjacent said pipes, a connecting link on said lever for normally holding said tank in elevated position, a dog pivotally mounted below the pivotal mounting of said counter balance lever, a detent on said lever normally engaged by said dog and a spring for holding said dog in operative position, substantially as described.

In testimony whereof I have signed my name to this specification in the presence of two subscribing witnesses.

CHARLES E. FAGAN

Witnesses:
 Philip J. Brady,
 Lillie Heffener.